Sept. 25, 1951        C. E. CRIPPS        2,568,792
APPARATUS FOR COOKING FOODS

Filed April 15, 1946        3 Sheets-Sheet 1

INVENTOR.
Charles E. Cripps
BY
ATTORNEYS.

Sept. 25, 1951 C. E. CRIPPS 2,568,792
APPARATUS FOR COOKING FOODS
Filed April 15, 1946 3 Sheets-Sheet 2

INVENTOR.
Charles E. Cripps
By Lancaster, Allwine & Rommel
Attorneys.

Sept. 25, 1951  C. E. CRIPPS  2,568,792
APPARATUS FOR COOKING FOODS
Filed April 15, 1946  3 Sheets-Sheet 3

INVENTOR.
Charles E. Cripps
By Lancaster, Allwine & Rommel
Attorneys.

Patented Sept. 25, 1951

2,568,792

UNITED STATES PATENT OFFICE 2,568,792

APPARATUS FOR COOKING FOODS

Charles E. Cripps, Culver City, Calif.

Application April 15, 1946, Serial No. 662,298

13 Claims. (Cl. 99—335)

This invention relates to the cooking of foods and particularly to improvements in and apparatus especially intended for a cooking of foods by the process known as French frying or deep fat frying.

Heretofore apparatus for deep fat frying has been known. However, such apparatus in general use has been subject to the disadvantages of requiring manual operation of the various steps necessary to the process, and of not removing the excess oil, thereby causing the foods to be less appetizing and requiring more frequent replacement of the cooking oil.

My invention has for its principal object to provide an insulated self-contained and automatic apparatus having a thermostatically controlled heating means and a basket or grill in which food is placed.

Other objects of the invention are to provide means to support the grill in a plurality of positions such that the grill will, in its lower position, allow the food to be submerged in the cooking oil and at the end of a predetermined time, provide means to automatically raise the grill above the oil and to automatically, by centrifugal displacement, remove all free oil from the food, such centrifugal motion to cease at the end of a predetermined time, leaving the food and grill supported above the cooking oil and ready to serve.

Further objects of my invention include the improved equipment, cooking utensils, operating apparatus, heating, timing and control mechanism. Details, advantages and still further objects of the invention will appear in the following specification in conjunction with the accompanying drawings forming a part thereof and claimed hereinafter.

Figure 1:
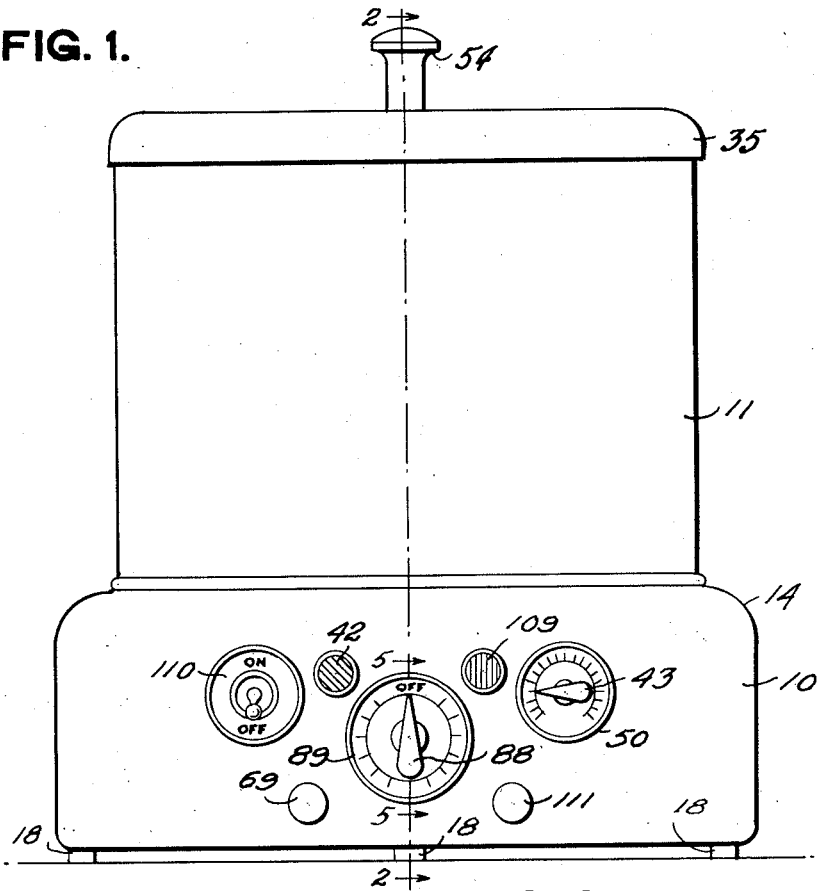
Fig. 1 is a front elevation view of a cooking apparatus embodying the principles of my invention particularly showing the arrangement of various control elements and indicators of the apparatus.

Referring to the drawings, in general the cooking apparatus in accordance with my invention comprises a base section 10 which houses the control elements and supports a cooking section 11 thereon. In this cooking section 11, a vertically movable and rotatable foraminous basket or receptacle 12 is supported, as a container for the foods to be cooked. The base section is preferably of square formation and cooking section 11 and basket 12 are preferably of cylindrical formation. The food basket 12 is arranged to be elevated from its lower cooking position shown in Fig. 1, after cooking a controlled period of time, to an upper position shown in dotted lines therein. In its upper position the basket 12 is subject to rotation for a predetermined length of time, to extract the excess cooking fluid, water or fat, from the cooked food by centrifugal force, thereby effecting a saving of cooking oil and affording a more appetizing cooked food. A highly satisfactory arrangement of this cooking apparatus together with the various controls and indicating elements including the heating, thermostatic and time controls, and the rotating motor driving mechanism will now follow in connection with the details of the structure of the several parts.

Base section 10 preferably is formed of pressed sheet metal having a flat top 13 with rounded corners 14 providing the connection with vertical side walls 15. The lower edge of side walls 15 are horizontally bent inwardly as shown at 16 or otherwise provided with suitable connecting tabs to which a bottom supporting frame structure 17 is secured. Frame 17 is preferably a casting or relatively heavy steel bar extending crosswise of base section 10 and leaving the major portion thereof open, supporting cushion element 18 elevating the base and permitting a circulation of air therein for ventilating and cooling the operating parts, hereinafter referred to.

Cooking section 11 includes a pot 19 having a flat bottom 20 with an integral cylindrical upwardly extending side wall 21, the pot 19 being of aluminum, enamel ware, or the like, as is the usual practice in cooking appliances. Bottom 20 is formed with connecting lugs 22 provided with threaded apertures for receiving screws 23 for securing the pot to base section 10, and is centrally perforated and formed with a circular downwardly extending collar 24.

Figure 3:
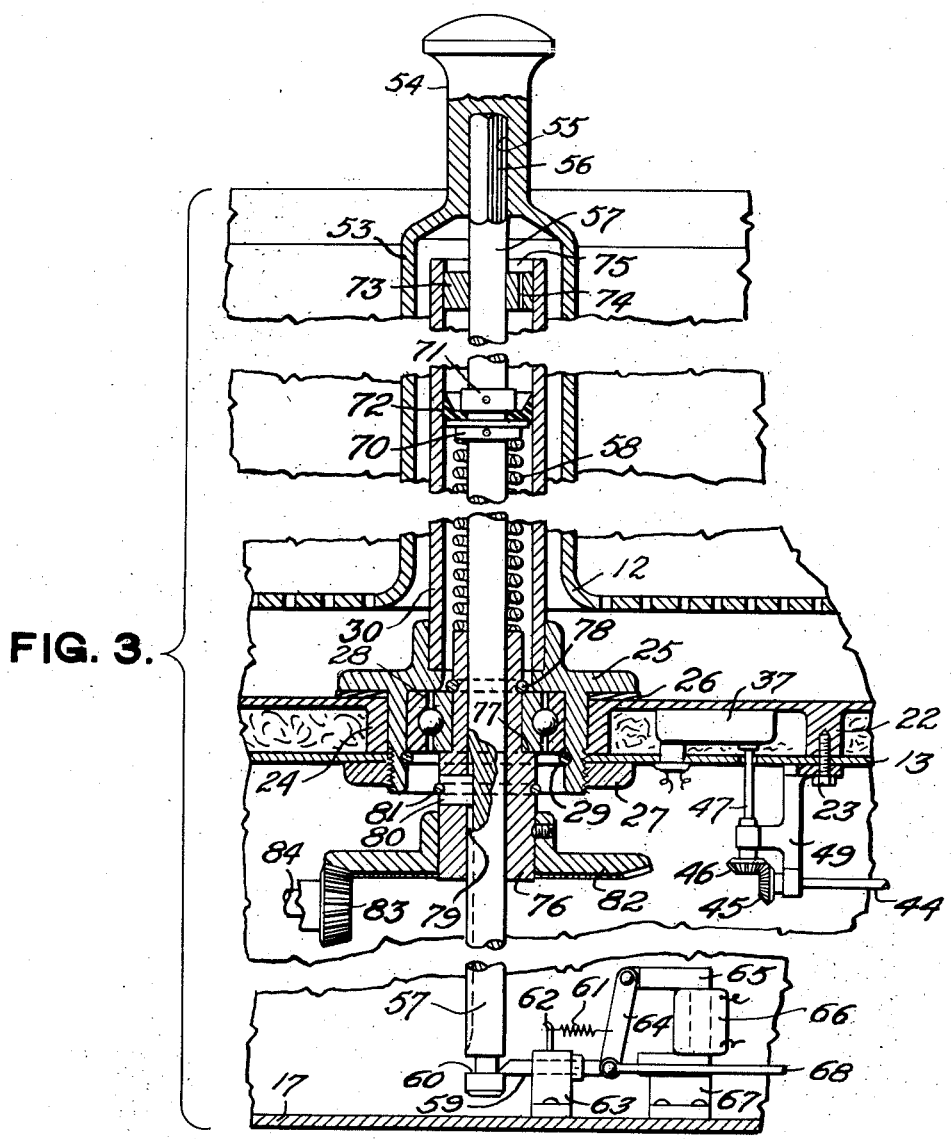
Fig. 3 is an enlarged fragmental sectional view showing the parts along central portion of Fig. 2, also along line 2—2 of Fig. 1.

As best shown in Fig. 3, collar 24 provides a housing for a machined hub 25 which is secured in a fluid tight manner therein by means of an upper gasket 26 and a locking nut 27 engaging the lower surface of the top 13 of base section 10 in the assembling of the parts. The lower portion of hub 25 houses a ball bearing 28 secured therein by a split ring 29, while the upper part receives a tube 30 secured integrally therein so as to be fluid tight and extending upwardly to substantially the level of the top side walls 21 of the pot 19.

Figure 4:
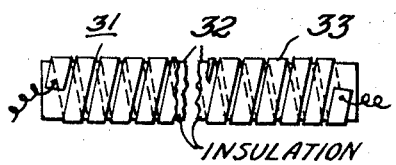
Fig. 4 is a fragmental detail view of a preferred form of electric heating element for the cooking apparatus in accordance with my invention.

Pot 19 has an electric heating element 31 of annular shape encircling the side wall 21 adjacent to the bottom thereof, this heating element being of usual construction, preferably as shown in Fig. 4 made up of heat resisting insulating material 32 such as mica upon which a Nichrome ribbon-type wire 33 is wound, there being a small insulating space between each turn. This assembly is then fastened around the outside of pot 19 near the bottom thereof. This construction lends itself well to the expansion and contraction of heating.

An outer cylindrical shell 34 concentrically surrounds the wall 21 of pot 19 and is secured to the top 13 of base section 10 (by means of an annular cap 35) and to the upper end of pot 19. Suitable heat insulating material 36 fills the space between the bottom and side walls of container 19 and the top of base section 10 and shell 34.

Figure 7:
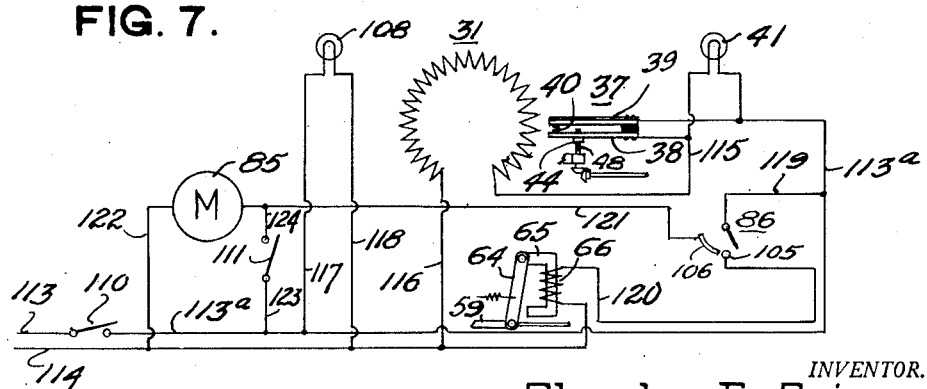
Fig. 7 is a wiring diagram of the electrical connections in the cooking apparatus in accordance with my invention.

A thermostatic switch 37 is mounted in direct engagement with the bottom 20 of pot 19 for controlling the circuit of the heating element 31 in accordance with the cooking liquid in the container. This thermostatic switch, as shown in the wiring diagram, Fig. 7, is of the bimetallic type with one element 38 adjustable. The other element 39 is a strip made up of two metals such as brass with a heavy nickel plate, which when heated will bend and open the contacts 40, one metal expanding more than the other.

A pilot light 41 is connected across the thermostat, this light will glow when the thermostat opens because it is a small lamp requiring much less current than the heater element. For the same reason, when the thermostat opens, the current in the heating element 31 is largely cut off and the temperature in the cooker drops a few degrees. This dropping of the temperature closes the thermostat contact 40 again. Thus the temperature is kept within certain limits. The pilot light goes on each time the thermostat opens. This light is covered with a green glass 42, as shown in Fig. 1, so it will be called the "green light." When the green light is on, the operator knows the oil is the proper temperature to cook the food.

The temperature adjusting knob 43 is attached to a shaft 44, the other end of which turns a small gear 45. This gear in turn meshes with a gear 46 on the thermostat shaft 47, which turns the adjusting screw 48 on the thermostat element, as best shown in Figs. 3 and 7. As shown in Fig. 3 shafts 44 and 47 are supported in a bearing bracket 49 which is held in place by an assembly screw 23 against the under side of top 13 of base section 10. As shown in Fig. 1 temperature adjusting knob 43 is set in accordance with indications on a dial indicator 50. Thus the temperature of the cooking fluid may be adjusted to the temperature required.

The basket 12 as heretofore stated is of cylindrical conformation, its cylindrical side walls 51 and horizontal bottom 52 being perforated to permit the free passage of cooking fluid therethrough. The bottom wall is provided with an imperforate upstanding tube 53 integral therewith and concentric with the cylindrical side walls 51 so as to provide a well balanced container which may be rotated for extracting liquids by centrifugal action from the cooked food contents. The upper end of tube 53 is contracted to provide a handle 54 by means of which the cooking receptacle 12 may be removed from the cooker. The interior of handle 54 is formed with a polygonal socket 55 in which the polygonal end 56 of a rotary shaft 57 is receivable, in a manner to rotate the receptacle by the rotation of shaft 57.

Figure 2:
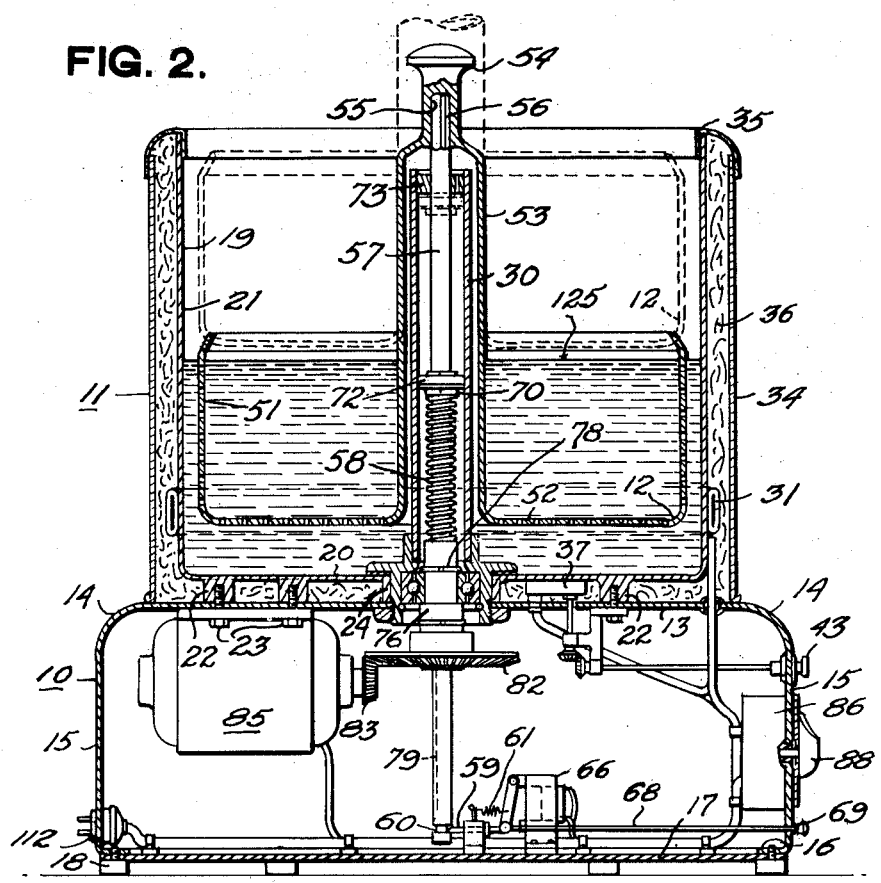
Fig. 2 is a vertical sectional view thereof taken substantially on line 2—2 of Fig. 1 with parts illustrated in elevation.

Shaft 57 is urged upwardly by means of a spring 58 so as to support the cooking receptacle 12 in the upper position as shown by dotted lines in Fig. 2 but is held down in the full line position by means of a latch 59 engaging an annular slot 60 adjacent to the lower end of the shaft 57 (see Figs. 2 and 3). Latch 59 is held in its projected position engaging slot 60 by means of a spring 61 connected between a projection 62 on a latch support 63 mounted on base frame 17 and an armature 64 which is pivotally connected with latch 59 and also one core arm 65 of an electromagnet 66, supported on a bracket 67 which in turn is secured to base frame 17. When electromagnet 66 is energized it operates to retract the latch 59 so as to release shaft 57 and permit spring 58 to elevate it and the cooking receptacle 12. Latch 59 also has a manually operable rod 68 provided with an operating knob 69 on its end exterior of base section 10 adjacent to the other controls and indicators.

When latch 59 is retracted to release shaft 57, the sudden release of the energy of spring 58 would, if not controlled, dislodge the food basket 12. However, to counteract this, at the junction of the upper end of spring 58 with shaft 57 between two collars 70, 71, secured on the shaft, is a packing ring or piston cup 72 which engages the inner wall of upright tube 30. Adjacent to the upper end of tube 30 is a bearing element 73 sealing the space between shaft 57 and tube 30 except for a vent port 74 which controls the flow of air therethrough and thereby controls the movement of the shaft and cooking receptacle to a smooth stop in its upper position. It will be noted that bearing 73 is pressed downwardly in tube 30 so that its upper surface is slightly below the upper end of tube 30 thereby providing a receptacle 75 into which any contaminated oil from shaft 57 will be received and not go over the end of tube 30 into the cooking receptacle.

Still referring particularly to Fig. 3, it will be noted that bearing 73 provides an upper bearing for shaft 57, and a lower bearing therefor comprises a hollow shaft 76 which in turn is secured to the inner race member of ball bearing 28, an enlarged portion or shoulder 77 engaging the lower end of the bearing and a split ring retainer 78 mounted in a groove in the hollow shaft 76 and engaging the upper end of the bearing to prevent the hollow shaft from moving downward with respect to the bearing. Shaft 57 is movable longitudinally in hollow shaft 76, between limits determined by the length of a keyway 79 therein but is prevented from turning with respect thereto by means of a key 80 which passes through shaft 76 and engages keyway 79. This key is held in position by means of a split ring retainer 81.

At the lower end of hollow shaft 76 is secured a relatively large bevel gear 82 which is engaged by a small driving bevel gear 83 on shaft 84 of a small driving motor 85. As shown in Fig. 2 the base of motor 85 is supported on the underside of top 13 of base section 10 by means of some of the assembly screws 23, lugs 22 being positioned for receiving the screws for that purpose. The gears 82 and 83 are of the required size for giving a proper reduction ratio for driving food receptacle 12 at the desired speed for effecting centrifugal separation of fluid from the cooked food in the food basket or receptacle 12 when it is in its elevated position.

Figure 5:
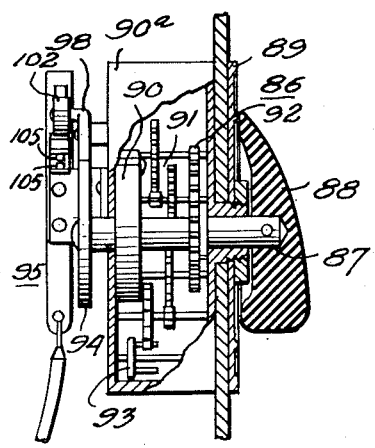
Fig. 5 is an enlarged transverse sectional view of the timer switch operating mechanism taken substantially along line 5—5 of Fig. 1.

In order to time the cooking of food in the food basket 12 in the lower position, submerged in the cooking fat or fluid in the cooking receptacle section 11 to the depth indicated, a timer mechanism 86 is employed, which is mainly of standard construction so will only be briefly described. As shown in Fig. 5, this timer includes a main shaft 87 having an exteriorly accessible knob 88 thereon which cooperates with a dial 89 graduated to indicate the setting of the knob in minutes required to properly "fry" the particular food placed in the food basket. When the knob is set to the desired operating time it winds a clock spring 90 one end of which is secured to the main shaft 87. The other end of spring 90 is anchored to a post in the timer case 90a which houses the train of clock gears 91 including a main gear 92 to main shaft 87 by a one-way clutch (not shown) so as to permit the spring 89 to be wound and also to permit free placement of the pointer or knob 88 with respect to dial 89. The gear train 91 drives a speed governor 93 (e. g., escapement) which determines the return movement of main shaft 87 in accordance with the dial setting of knob 88.

Figure 6:
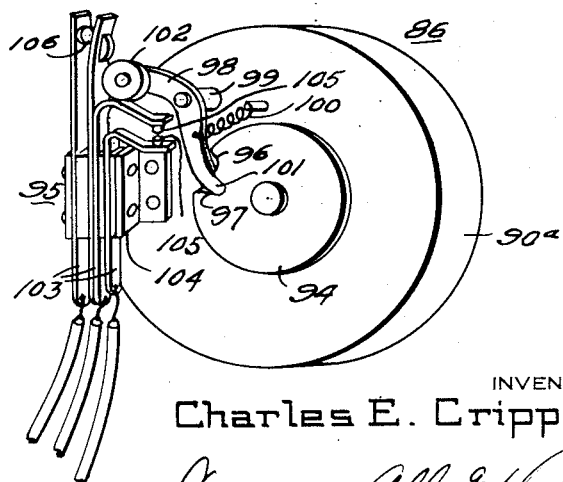
Fig. 6 is an enlarged perspective detail view of the switch operating mechanism of the timer.

As shown in Fig. 6 exterior of case 90a, on the inner end of main shaft 87, is a slotted disk 94 for operating switch 95. Switch 95 controls latch retracting electromagnet 66 and operating motor 85 for rotating the food basket 12 in its elevated position for a short period of time (such as a minute) terminated when the knob 88 reaches the "Off" position on the dial and the switch contacts are opened until the next setting of the timer. To accomplish this disk 94 is provided with a slot 96 and a succeeding deeper slot 97 corresponding to the "Off" position. A lever 98 is mounted on a pivot 99 on the time case 90a with a spring 100 urging the lever end 101 into engagement with disk 94 and into the slots 96 and 97. On the other end of lever 98 is a contact operating roller 102 of insulating material for closing and opening the contacts of switch mechanism 95.

Switch mechanism 95 includes three blades 103 insulated from each other and carried by a bracket 104 mounted on timer case 90a. These blades carry two pairs of contacts 105 and 106 for the latch retracting electromagnet 66 and motor 85, respectively. When lever end 101 drops into slot 96 roller 102 passes over a projection 107 momentarily closing contacts 105 as it drops and then closes contacts 106 which remain closed until lever end 101 drops into slot 97 when the timer is in "Off" position and the contacts are opened.

In addition to the controls and indicators referred to hereinbefore there is also included an indicator light 108, having a red glass covering 109, which light goes on when the main switch 110 is in "On" position. A push type of switch 111 is also included in the controls so that the motor may be momentarily energized at any time main switch 110 is closed, so that the food receptacle 12 can be spun without using the timer switch. As to the indicators, it will be seen that the red pilot light 108—109 is on whenever the main switch 110 is on and the green pilot light 41—42 goes on when the cooking fluid reaches the temperature selected in accordance with the thermostat setting by knob 43.

The cooker is provided with a plugging connector 112 of usual construction for connection with an extension cord (not shown in the drawings), for supplying power to the cooker by conductors 113 and 114 shown in the complete wiring diagram, Fig. 7. While various circuits have been referred to in connection with the control, operating and indicating devices they will be briefly summarized as follows: Main switch 110 connects conductor 113 with conductor 113a to continue the power thereto when the switch is closed. Conductor 113a is connected with the bimetallic element 39 of thermostat 37 and conductor 115 connects the thermostat element 38 with heater 31 and thence heater 31 is connected by conductor 116 with conductor 114, pilot light 41 therefor, being connected across thermostat elements 38 and 39. Pilot light 108 is connected with the power conductors 113a and 114 by conductors 117 and 118 and is energized whenever main switch 110 is in "On" position. Conductor 113a is connected with the midcontacts of timer switch 95 by conductor 119. When contacts 105 are closed the circuit is continued by conductor 120 through latch operating electromagnet 66 which is connected directly with conductor 114. When contacts 106 are closed the circuit is continued by conductor 121 through motor 85 and conductor 122 to conductor 114. Motor 85 may also be energized by closing switch 111 between conductors 113a and conductor 121 connected therewith by conductors 123 and 124 respectively.

In operation cooking oil or grease is put in container 11 up to level 125 and is heated to a predetermined temperature by the electric heating element 31, the temperature being controlled by thermostat 37. When the oil reaches the required temperature, pilot light 41 connected in shunt with the thermostat will light. At this signal the food to be French fried is placed in the perforated basket 12. Then, by exerting manual pressure downward, spring 58 is compressed and the lower end of shaft 57, being recessed at 60, is caught by pawl 59 and permits the basket 11 to remain submerged in the cooking oil. At this point, the timer 86 is set to the correct number of minutes required to properly "fry" the particular food being used. The timer works back to an "Off" position, taking the predetermined number of minutes to do so. However approximately one minute before the pointer reaches the "Off" position, contacts 105 are actuated, energizing the electromagnet 66 and releasing shaft 57, allowing spring 56 to raise the basket above the cooking oil level. At the same time, the motor 85 is turned on and spins the basket centrifugally displacing the free oil. At the end of approximately a minute, the timer has reached the "Off" position. This turns off the motor, leaving the basket supported above the oil and ready for a repeat operation.

While the embodiment of the present invention as herein disclosed constitutes a preferred form, it is to be understood that other forms might be adopted, all coming within the scope of the claims which follow.

I claim:

1. An improved cooking apparatus for deep fat frying and the like comprising, a hollow base, a deep fat receptacle supported thereon, a foraminous food receptacle in the deep fat receptacle, an electric heating element for heating deep fat placed in the deep fat receptacle, said deep fat receptacle having a central opening in its bottom and a tube extending upwardly therefrom in fluid tight relation therewith to a height substantially to the top of the deep fat receptacle, said food receptacle also having a central opening therethrough with a tube extending upwardly therefrom and of a length to permit it to extend over the tube of the deep fat receptacle so that the food receptacle may be positioned in the lower portion of the deep fat receptacle, a rotatable shaft concentrically mounted in the tube of the deep fat receptacle upon which the upper portion of the tube of the food receptacle is removably secured so as to be rotated by said shaft, a motor in said base operable to rotate said shaft, said shaft being longitudinally movable in its mountings in the tube of the deep fat receptacle, a spring operating on said shaft tending to raise it to elevate the food receptacle to its upper position, a latch cooperating with the lower end of said shaft to retain it in its lower position, a bearing for said shaft carried by the upper portion of said tube of the deep fat receptacle, said bearing provided with a small vent port therethru to permit slow passage of air therethru, a piston carried by said shaft in engagement with the inner wall of said tube of the deep fat receptacle, located remote from said bearing when the shaft is in a lowered position with the food receptacle in the lower portion of the deep fat receptacle and constructed and arranged to force air thru the port of said bearing when the shaft moves upwardly responsive to said spring, and thereby retard rapid upward movement of the shaft and food receptacle, and means for releasing the latch and starting the motor for rotating the shaft.

2. An improved cooking apparatus for deep fat frying and the like comprising, a hollow base, a deep fat receptacle supported thereon, a foraminous food receptacle in the deep fat receptacle, an electric heating element for heating deep fat placed in the deep fat receptacle, said deep fat receptacle having a central opening in its bottom and a tube extending upwardly therefrom in fluid tight relation therewith to a height substantially to the top of the deep fat receptacle, said food receptacle also having a central opening therethrough with a tube extending upwardly therefrom and of a length to permit it to extend over the tube of the deep fat receptacle so that the food receptacle may be positioned in the lower portion of the deep fat receptacle, a rotatable shaft concentrically mounted in the tube of the deep fat receptacle upon which the upper portion of the tube of the food receptacle is removably secured so as to be rotated by said shaft, a motor in said base operable to rotate said shaft, said shaft being longitudinally movable in its mountings in the tube of the deep fat receptacle, a spring operating on said shaft tending to raise it to elevate the food receptacle to its upper position, a latch cooperating with the lower end of said shaft to retain it in its lower position, means carried by said shaft and tube of the deep fat receptacle, constructed and arranged to retard rapid upward movement of the shaft and food receptacle responsive to action of said spring, and means for releasing the latch and starting the motor for rotating the shaft.

3. In a deep fat fryer, a foraminous food holder, a pot, a shaft on the upper end of which said holder is mounted, bearing means in the bottom of said pot, in which said shaft is mounted for vertically shifting and rotating movements, said pot having a lower portion for holding and heating a body of cooking fat and an upper portion defining a centrifuge chamber, a timer, means controlled by said timer for retaining the food holder in the submerged position for a predetermined cooking period and for releasing the holder at the end of said period, means yieldingly biasing the holder upwardly and rendered operable by the release of the holder for elevating the holder to said centrifuging position, an electric motor having a driving connection with said shaft below said pot and rendered operable by said timer shortly after the holder is released to its elevated position, for rotating the holder, and means controlled by said timer for terminating said rotation at the end of a predetermined period.

4. In a deep fat fryer, a foraminous food holder, a pot, a shaft on the upper end of which said holder is mounted, bearing means in the bottom of said pot, in which said shaft is mounted for vertically shifting and rotating movement, said pot having a lower portion for holding and heating a body of cooking fat of sufficient depth to submerge the holder, and an upper portion defining a centrifuge chamber of sufficient height above such body of fat to entirely contain the holder in a centrifuging position elevated above the fat, means cooperating with said shaft below the pot for retaining the holder in a submerged position, a timer, means controlled by said timer to automatically release the holder from said retaining means, whereby to determine the end of a cooking period, means to raise said holder from the submerged position to said centrifuging position when thus released, and means directly controlled by said timer and having a driving connection with said shaft below said pot to automatically rotate said holder to centrifugally dispel fat from the food therein when said holder is in said centrifuging position, the dispelled fat being caught by the wall of said centrifuge chamber and returned to said body.

5. In a deep fat fryer, a foraminous food holder, a pot, a shaft on the upper end of which said holder is mounted, bearing means in the bottom of said pot, in which said shaft is mounted for vertically shifting and rotating movements, said pot having a lower portion for holding and heating a body of cooking fat of sufficient depth to submerge the holder, and an upper portion defining a centrifuge chamber of sufficient height above such body of fat to entirely contain the holder in a centrifuging position elevated above the fat, means for retaining the holder in a stationary submerged position for a predetermined cooking period and then releasing it, means automatically operable upon release of the holder for raising it from the submerged position to said centrifuging position, and means having a driving connection with said shaft below said pot and automatically operable upon arrival of the holder at said centrifuging position, for rotating the holder to dispel fat from the food contained therein, the fat thus dispelled being caught by the wall of said centrifuge chamber and returned to said body of fat.

6. In a deep fat fryer, a foraminous food holder, a pot, a shaft on the upper end of which said holder is mounted, bearing means in the bottom of said pot, in which said shaft is mounted for vertically shifting and rotating movements, said pot having a lower portion for holding and heating a body of cooking fat and an upper portion defining a centrifuge chamber, means for retaining the holder in a stationary submerged position for a predetermined cooking period and then releasing it, means yieldingly biasing the holder towards said centrifuging position and operative upon release of the holder to raise it to that position, and means having a driving connection with said shaft below said pot and automatically operable for rotating the holder in said centrifuging position.

7. In a deep fat fryer, a foraminous food holder, a pot for holding a body of cooking fat, a shaft on the upper end of which said holder is mounted, bearing means in the bottom of said pot, in which said shaft is mounted for vertically shifting and rotating movements, means for retaining the holder in a submerged position for a predetermined cooking period and for releasing the holder at the end of such period, means yieldingly biasing the holder upwardly and operative to raise the holder to a centrifuging position above the body of fat when released, means having a driving connection with said shaft below said pot for delaying the upward movement of the holder, and means for rotating the holder in the centrifuging position.

8. In a deep fat fryer, a hollow base, a pot mounted upon said base, a tube sealed to the bottom of said base and projecting upwardly, a drive shaft extending from within said hollow base upwardly through said tube, a foraminous annular food holding basket having an unobstructedly open upper end including a central tubular portion receiving the upper portion of said tube and mounted upon the upper end of said shaft, bearing means mounting said shaft for rotation and for vertical sliding movement within said tube, a motor for transmitting rotation to the lower end of said shaft, the upper end of said shaft transmitting said rotation to said basket, a latch coacting with the lower end of said shaft for latching the basket in a lowered position in said pot, a timer, means controlled by said timer for releasing said latch at the end of a predetermined cooking period, means operable upon release of said latch and acting through said shaft to raise said basket to a centrifuging position within said pot, and means controlled by said timer for actuating said motor for a predetermined centrifuging period when the basket is in the raised position.

9. In a deep fat fryer, a base, a pot supported thereon, a drive shaft extending upwardly through the bottom of said pot, bearing means in which said drive shaft is mounted for rotation and for vertical sliding movement, a food holding basket mounted upon the upper end of said shaft and adapted to be moved by said shaft from a lowered position submerged within a body of cooking fat in the pot to a centrifuging position raised above the fat, said pot projecting upwardly above the basket in said centrifuging position, means for transmitting rotation to the lower end of said shaft and through said shaft to said basket for rotating the same in the centrifuging position, means cooperable with said shaft to hold the basket in a submerged position for a predetermined cooking period, and to then release the shaft for upward movement, means rendered operable by the releasing of the shaft to move the basket upwardly to the centrifuging position, and means operable when the basket is in the centrifuging position for rotating the basket for a predetermined period of centrifuging operation.

10. In a deep fat fryer, a hollow base, a pot mounted on said base, a tube sealed to and extending upwardly from the bottom of said pot, a shaft extending from within the hollow base upwardly through said tube, bearing means in which said shaft is mounted for rotation and for vertically sliding movement, a motor within the hollow base for rotating the shaft, an annular foraminous food holding basket having a tubular central portion receiving said tube, a driving connection between the upper end of said shaft and the upper end of said tubular central portion removably mounting said basket on said shaft, a coil spring acting under compression between said shaft and said tube, for elevating the shaft so as to elevate the basket from a cooking position submerged in a body of fat in the pot to a centrifuging position above the body of fat that is completely enclosed in the pot, means cooperable with the lower end of said shaft for holding it in the lowered position in which said basket is submerged, a timer, means controlled by the timer for releasing said holding means to allow elevation of the basket to the centrifuging position, means rendered operable by the releasing of the shaft to move the basket upwardly to the centrifuging position, and means operable when the basket is in the centrifuging position for rotating the basket for a predetermined period of centrifuging operation.

11. In a deep fat fryer, a pot, a shaft extending vertically through the bottom of said pot, bearing means in which said shaft is mounted for rotation and for vertically sliding movement, a food holding basket mounted upon the upper end of said shaft, spring means urging said shaft and basket upwardly from a lowered position submerged within a body of fat in the pot to a centrifuging position above the fat, said pot having an upper portion enclosing and extending above the upper extremity of the basket in the centrifuging position thereof, a latch cooperable with said shaft to hold the basket in the submerged position for a predetermined cooking period, means to release said latch at the expiration of said cooking period, means for rotating said shaft and basket, means for initiating the operation of said rotating means shortly after the release of said latch mechanism, to rotate the basket in the centrifuging position, and means for delaying the upward movement of the shaft and basket under the action of said spring means.

12. In a deep fat fryer, a foraminous food holder, a pot, a shaft on the upper end of which said holder is mounted, bearing means in the bottom of said pot, in which said shaft is mounted for vertically shifting and rotating movements, said pot having a lower portion for holding and heating a body of cooking fat of sufficient depth to submerge the holder, and an upper portion defining a centrifuge chamber of sufficient height above such body of fat to entirely contain the holder in a centrifuging position elevated above the fat, a timer, means controlled by said timer for retaining the food holder stationary in the submerged position for a predetermined cooking period and then releasing it, means yieldingly biasing the holder toward said centrifuging position and operative upon release of the holder to move it to that position, means controlled by said timer and having a driving connection with said shaft below said pot, for automatically rotating the holder when it reaches said centrifuging position, means controlled by said timer for automatically terminating said rotation at the end of a predetermined period of time, and manually operable means for setting the timer for selected durations of the cooking period.

13. In a deep fat fryer, a foraminous food holder, a pot, a shaft on the upper end of which said holder is mounted, bearing means in the bottom of said pot, in which said shaft is mounted for vertically shifting and rotating movements, said pot having a lower portion for holding and heating a body of cooking fat and an upper portion defining a centrifuge chamber, a timer, means controlled by said timer for holding the food holder in the submerged position for a predetermined cooking period and then automatically raising the holder to a centrifuging position within said centrifuge chamber, means controlled by said timer and having a driving connection with said shaft below said pot to automatically rotate said holder to centrifugally dispel fat from the food therein when said holder is in said centrifuging position, the dispelled fat being caught by the wall of said centrifuge chamber and returned to said body.

CHARLES E. CRIPPS.

REFERENCES CITED

The following references are of record in the file of this patent:

UNITED STATES PATENTS

| Number | Name | Date |
| --- | --- | --- |
| 1,310,495 | Ford | July 22, 1919 |
| 1,371,541 | Babendreer | Mar. 15, 1921 |
| 1,413,882 | Wheelock | Apr. 25, 1922 |
| 1,506,712 | McAllen | Aug. 26, 1924 |
| 1,666,019 | McCarthy | Apr. 10, 1928 |
| 1,741,791 | Reck | Dec. 31, 1929 |
| 1,824,685 | Pittock | Sept. 22, 1931 |
| 1,890,737 | Leweke | Dec. 13, 1932 |
| 1,977,454 | Price | Oct. 16, 1934 |
| 2,050,303 | Forshee | Aug. 11, 1936 |
| 2,052,919 | Brogdon et al. | Sept. 1, 1936 |
| 2,097,793 | Howell | Nov. 2, 1937 |
| 2,177,166 | Bemis | Oct. 24, 1939 |
| 2,212,317 | Friedman | Aug. 20, 1940 |